(12) United States Patent
Arimilli et al.

(10) Patent No.: US 10,831,593 B2
(45) Date of Patent: *Nov. 10, 2020

(54) LIVE PARTITION MOBILITY ENABLED HARDWARE ACCELERATOR ADDRESS TRANSLATION FAULT RESOLUTION

(71) Applicant: International Business Machines Corporation, Armonk, NY (US)

(72) Inventors: Lakshminarayana B. Arimilli, Austin, TX (US); Richard L. Arndt, Austin, TX (US); Bartholomew Blaner, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/238,862

(22) Filed: Jan. 3, 2019

(65) Prior Publication Data

US 2019/0155683 A1 May 23, 2019

Related U.S. Application Data

(63) Continuation of application No. 15/798,899, filed on Oct. 31, 2017, now Pat. No. 10,216,568, which is a
(Continued)

(51) Int. Cl.
*G06F 11/30* (2006.01)
*G06F 11/10* (2006.01)
(Continued)

(52) U.S. Cl.
CPC ...... *G06F 11/1016* (2013.01); *G06F 9/45558* (2013.01); *G06F 12/1036* (2013.01);
(Continued)

(58) Field of Classification Search
None
See application file for complete search history.

(56) References Cited

U.S. PATENT DOCUMENTS

| | | | | |
|---|---|---|---|---|
| 6,490,657 B1 * | 12/2002 | Masubuchi | ......... | G06F 11/2041 711/135 |
| 7,389,462 B1 * | 6/2008 | Wang | ..................... | H04L 1/188 714/748 |

(Continued)

OTHER PUBLICATIONS

List of IBM Patents or Applications Treated as Related, Jan. 2019.
(Continued)

*Primary Examiner* — Mujtaba M Chaudry
(74) *Attorney, Agent, or Firm* — Lieberman & Brandsdorfer, LLC

(57) ABSTRACT

Hardware accelerator memory address translation fault resolution is provided. A hardware accelerator and a switchboard are in communication with a processing core. The hardware accelerator determines at least one memory address translation related to an operation having a fault. The operation and the fault memory address translation are flushed from the hardware accelerator including augmenting the operation with an entity identifier. The switchboard forwards the operation with the fault memory address translation and the entity identifier from the hardware accelerator to a second buffer. The operating system repairs the fault memory address translation. The operating system sends the operation to the processing core utilizing an effective address based on the entity identifier. The switchboard, supported by the processing core, forwards the operation with the repaired memory address translation to a first buffer and the hardware accelerator executes the operation with the repaired address.

20 Claims, 8 Drawing Sheets

Related U.S. Application Data continuation of application No. 15/583,033, filed on May 1, 2017, now Pat. No. 10,572,337.

(51) Int. Cl.
*G06F 9/455* (2018.01)
*G06F 12/1036* (2016.01)
*G06F 13/40* (2006.01)
*G06F 13/16* (2006.01)

(52) U.S. Cl.
CPC ...... *G06F 13/1673* (2013.01); *G06F 13/4022* (2013.01); *G06F 2009/45583* (2013.01); *G06F 2212/657* (2013.01)

(56) References Cited

U.S. PATENT DOCUMENTS

| | | | |
|---|---|---|---|
| 7,487,341 B2 | 2/2009 | Wang et al. | |
| 7,869,355 B2 * | 1/2011 | Kodama | H04L 47/10 370/230 |
| 8,099,474 B2 | 1/2012 | Thorpe et al. | |
| 8,683,175 B2 | 3/2014 | Ekanadham et al. | |
| 9,148,402 B2 | 9/2015 | Pratapa et al. | |
| 9,690,495 B2 | 6/2017 | Albot et al. | |
| 2004/0257370 A1* | 12/2004 | Lippincott | G06F 9/3879 345/502 |
| 2008/0005546 A1 | 1/2008 | Wang et al. | |
| 2009/0216958 A1* | 8/2009 | Biles | G06F 13/1668 711/148 |
| 2010/0332721 A1 | 12/2010 | Yamada et al. | |
| 2011/0161620 A1 | 6/2011 | Kaminski et al. | |
| 2012/0239904 A1 | 9/2012 | Ekanadham et al. | |
| 2013/0304990 A1 | 11/2013 | Bass et al. | |
| 2017/0116132 A1* | 4/2017 | Mealey | G06F 12/1009 |
| 2017/0123684 A1* | 5/2017 | Albot | G06F 9/455 |
| 2017/0132083 A1* | 5/2017 | Aslot | G06F 11/079 |
| 2017/0255509 A1* | 9/2017 | Tsuboi | G06F 11/1044 |
| 2017/0344489 A1 | 11/2017 | Kapoor | |

OTHER PUBLICATIONS

ROC920160110AUS01, May 1, 2017, U.S. Appl. No. 15/583,033, 2018/0314588.
ROC920160110BUS01, May 1, 2017, U.S. Appl. No. 15/583,040, 2018/0314582.
ROC920160110US1, May 1, 2017, U.S. Appl. No. 15/582,974, 2018/0314581.
ROC920160110AUS02, Oct. 31, 2017, U.S. Appl. No. 15/798,899, 2018/0314589.
ROC920160110BUS02, Nov. 2, 2017, U.S. Appl. No. 15/801,698, 2018/0314584.
ROC920160110US02, Oct. 30, 2017, U.S. Appl. No. 15/797,984, 2018/0314583.

* cited by examiner

LIVE PARTITION MOBILITY ENABLED HARDWARE ACCELERATOR ADDRESS TRANSLATION FAULT RESOLUTION

CROSS REFERENCE TO RELATED APPLICATIONS

This application is a continuation patent application claiming the benefit of the filing date of U.S. patent application Ser. No. 15/798,899 filed on Oct. 31, 2017 and titled "Live Partition Mobility Enabled Hardware Accelerator Address Translation Fault Resolution", now pending, which is a continuation patent application claiming the benefit of the filing date of U.S. patent application Ser. No. 15/583,033 filed on May 1, 2017 and titled "Live Partition Mobility Enabled Hard Accelerator Address Translation Fault Resolution", now pending, the entire contents of which are hereby incorporated by reference.

BACKGROUND

The present embodiments relate to the operation of a hardware accelerator. More specifically, the embodiments relate to hardware accelerator memory address translation fault resolution.

Hardware accelerators are often included in processor-based systems such as computer systems to perform specific operations efficiently in hardware rather than in software. Traditionally, a hardware accelerator performs complex parallel transformations on input data, which can enhance performance of a computer based system. Additionally, in some cases, the hardware acceleration can be more power-efficient than performing the same tasks in software. Power efficiency can be even greater if the hardware accelerators are incorporated on the same semiconductor substrate ("on-chip") as the processors. Particularly, integrating hardware accelerators onto multi-core chips such as chip multiprocessors and/or chip multithreaded processors can be efficient, because the accelerator can be shared among the cores/threads.

Typically, a privileged layer of software in the computer system manages access to the hardware accelerator. The access management enables the hardware to be shared in a distributed manner so that various threads/cores have the opportunity to take advantage of the hardware accelerator. Additionally, the access management enables the hardware accelerator to be shared in a secure manner (e.g. preventing one thread/core from disrupting, and/or corrupting, the operation issued by another thread/core to the hardware accelerator).

SUMMARY

A system, computer program product, and method are provided for hardware accelerator memory address translation fault resolution. More specifically, embodiments relate to flushing an operation with an address translation fault from the hardware accelerator during repairing of the address translation fault.

In one aspect, the system, computer program product, and method provide memory translation fault resolution between a processing core and a hardware accelerator. Responsive to a determination of a memory address translation related to the operation having a fault, the operation and the fault memory address translation are flushed from the hardware accelerator. The flushing includes augmenting the operation with an entity identifier. The operation with the fault memory address translation is forwarded from the hardware accelerator to a second buffer operatively coupled to a hypervisor or an operating system. Execution of the operating system is interrupted and the fault memory address translation is repaired by the operating system. A table operatively coupled to the operating system is configured with the entity identifier associated with an effective address for an entity. The operation with the repaired memory address translation is sent to the processing core. The sending utilizes the effective address for the entity based on the table and the entity identifier within the fault memory address translation. The operation with the repaired memory address translation is forwarded from the second buffer to the first buffer supported by the processing core. Processing of the operation returns to the hardware accelerator to execute the operation with the repaired address.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
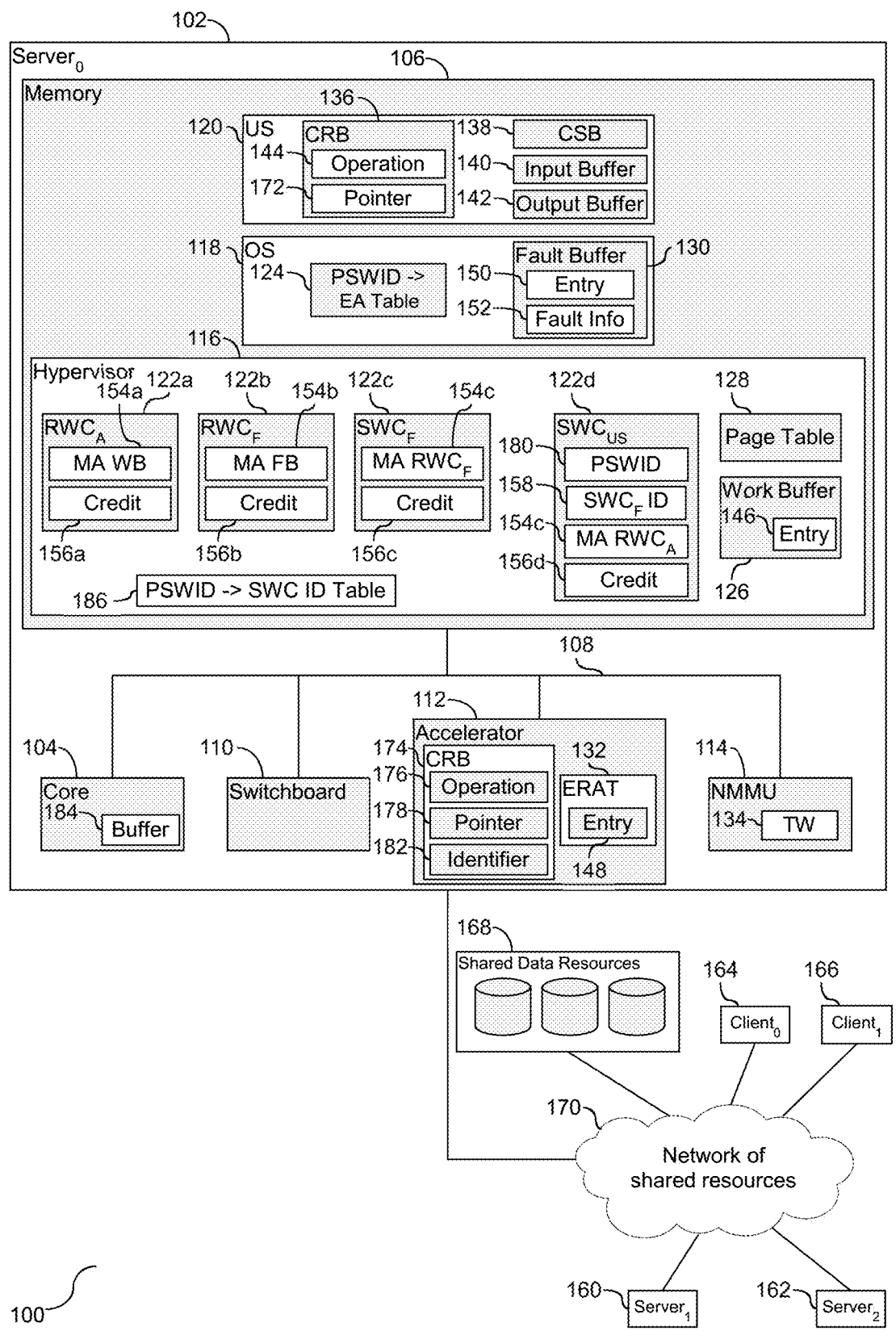
FIG. 1 depicts a block diagram illustrating a computer system that supports hardware accelerator address fault resolution.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A hardware accelerator is a physical device comprising circuitry that performs an operation in hardware rather than performing the operation in software on a general-purpose processor. For example, a hardware accelerator, such as the NVIDIA Tesla P100 graphics processing unit (GPU), may perform virtual memory paging and memory address translation fault support in hardware without the use of software executing in the general-purpose processor of the system. Virtual memory paging manages movement of data pages between virtual memory space and physical memory space. Additionally, a hardware accelerator, such as a network adapter, may perform encryption, decryption, and authentication in hardware. Accordingly, the hardware accelerator reduces a workload on the general-purpose processor by performing the operation in hardware without requiring execution of software by the general-purpose processor.

However, hardware accelerators suffer from several problems when they have to operate on a large amount of data from multiple sources which require memory address translations on behalf of a calling context. For example, when a memory address translation incurs a fault and the hardware accelerator waits for the fault to be repaired before performing the next memory address translation, latency is introduced to all jobs waiting to be executed by the hardware accelerator. Additionally, not all hardware accelerators are enabled to context switch from the fault memory address translation to a second memory address translation. To design a hardware accelerator which performs a context switch adds increased complexity to the hardware accelerator. Therefore, a system, method, and apparatus are needed to reduce latency induced as result of memory address fault translation resolution.

A system, method, and computer program product are disclosed and described herein to enable the hardware accelerator to execute a memory address translation while a faulting address translation is repaired without requiring a context switch. When a memory address translation faults, the hardware accelerator flushes an operation associated with the fault from the hardware accelerator. The operating system is instructed to repair the fault memory address translation while the hardware accelerator is enabled to execute a second address translation. After repairing the fault memory address translation the operation associated with the repaired memory address translation is returned to the hardware accelerator for execution.

Referring to FIG. 1, a block diagram (100) is provided illustrating a computer system that supports hardware accelerator address fault resolution. The system is shown with multiple servers, client machines, and shared resources in communication across a network. System tools for resolving the address fault as shown embedded in $server_0$ (102), although in one embodiment they may be provided on another machine in the network. $Server_0$ (102) is shown configured with a processing core (104) in communication with a memory (106) across a bus (108). The processing core (104) is configured with a buffer (184), also referred to herein as a paste buffer. In one embodiment, buffer (184) is cache memory of the processing core (104). The processing core (104) is configured to execute instructions. The processing core (104) may be single threaded or multi-threaded.

A thread may comprise a sequence of one or more instructions that are defined as an executable unit and that may be executed in parallel with other threads. An application running in memory (106) may have one or more processes which may comprise one or more threads having instructions to be executed by the processing core (104). Similarly, an operating system (OS) (118) or a hypervisor (116) may comprise one or more processes, each of which may comprise one or more threads to be executed by processing core (104). Accordingly, at least one processing core (104) is provided to execute instructions.

$Server_0$ (102) is also shown in communication with a network of shared resources (170) across a network connection to access shared resources, including, but not limited to, shared data resources (168), client machines, $client_0$ (164) and $client_1$ (166), and other servers, $server_1$ (160) and $server_2$ (162). The quantity of client machines, servers, and data resources shown and described herein are for illustrative purposes and should not be considered limiting.

As shown, hypervisor (116) is configured to support virtualization of hardware components within $server_0$ (102). For example, the hypervisor (116) supports virtualization of memory (106) including virtual memory space partitioned into contiguous blocks of virtual memory, also referred to as pages. Each page is referenced by an effective address (e.g. virtual address) which has a corresponding real address (e.g. physical address). A page table (128) is used to store a mapping of effective addresses to real addresses in order to support the virtualization of one or more hardware components. The hypervisor may utilize a Partition Send Window Context Identifier (PSWID) to a send window context SWC ID table (186) to associate an identifier for an associated user session (e.g., PSWID) with an identifier for a send window context associated with the user session (e.g., a SWC ID). The PSWID to SWC ID table (186) supports live partition mobility including virtualization of context windows as discussed below. Accordingly, the hypervisor (116) supported by the page table (128) enables virtualization of memory (106).

The hypervisor (116) supports one or more operating systems (OS), including OS (118). Similarly, OS (118) supports one or more user sessions, including user session (US) (120). User session (120) is a logged on session of the OS (118). The user session (120) has one or more processes having one or more instructions to be executed by processing core (104). Additionally, each instruction for execution by the processing core (104) may have one or more operations to be executed by a co-processor such as a hardware accelerator (112). The one or more operations, such as operation (144), are stored in a co-processor request block (CRB) (136) in the effective address space of user session (120). The CRB (136) includes at least one pointer (172) that is a data object which has an effective address which references another location in memory (106). For example, pointer (172) may reference an input buffer (140) which stores one or more memory addresses to be used as source data. Similarly, pointer (172) may reference an output buffer (142) which stores one or more memory addresses to be used as target data. Additionally, pointer (172) may reference a co-processor status block (CSB) (138) which maintains a status of the operation (144) in CRB (136). In one embodiment, the CSB (138) contains a task completion bit that is 0 if the corresponding job is incomplete and 1 if the corresponding job is complete. In one embodiment, the task completion bit is 1 if the corresponding job is incomplete and 0 if the corresponding job is complete. In one embodiment, the CRB is 128 bytes. Accordingly, the CRB is used to store operations to be executed by the hardware accelerator.

The operations, such as operation (144) within CRB (136), may be idempotent. An idempotent operation is an operation that can be executed multiple times without changing the result of the execution of the operation. For example, during a first execution of operation (144) a first real address will be determined for an effective address. During all subsequent iterations of the execution of operation (144) the same first real address will be determined. An examination of CRB (136), CSB (138), input buffer (140), and output buffer (142) will reveal the operation (144) has either been executed or has not been executed but will not provide how many iteration(s) of execution of the operation (144) have been performed. Accordingly, the operation (144) may be iteratively executed and achieve the same result.

The CRB may be moved between hardware components and/or memory by a paste bus operation. The paste bus operation includes a copy/paste pair. For example, a copy operand is used to refer to an effective address of data to be copied from memory. The effective address is translated to a real address by processing core (104). Data at the real address is retrieved from memory, such as memory (106), and the retrieved data is loaded into buffer (184). A paste operation is used to paste the data loaded into buffer (184) to a destination through bus (108). The data from the buffer (184) is pasted with an effective address for the destination that is translated to a real address of the destination. In one embodiment, the real address includes an identifier of a send window context. The paste data operation, which is the contents of buffer (184), may include, but is not limited to, a CRB sent by user session (120), a CRB sent by OS (118), and a CRB sent by the hardware accelerator that has incurred a memory address translation fault hereinafter referred to as an address translation fault.

An accelerator switchboard (110) is provided in communication with memory (106) to support routing of the data pasted on bus (108) to a destination. The accelerator switchboard (110) identifies the pasted data and utilizes a memory write operation to support routing of the data to the destination. Accordingly, the accelerator switchboard (110) facilitates routing of data on bus (108).

The hypervisor (116) is provided with a plurality of functionality to support the processing of CRBs by the accelerator switchboard (110) and the hardware accelerator (112). The hypervisor (116) is configured with a work buffer (126) corresponding to hardware accelerator (112). The work buffer (116) is utilized herein as a queue for operations to be executed by hardware accelerator (112). The work buffer (126) is provided with one or more entries, such as entry (146) to store a CRB, such as CRB (136), including operations within the CRB such as operation (144). In one embodiment, work buffer (126) is a first-in-first-out (FIFO) buffer. In one embodiment, the work buffer (126) is at least 128 bytes. In one embodiment, there are at least two work buffers corresponding to two separate hardware accelerators. Accordingly, the work buffer (126) stores operations to be executed by the hardware accelerator (112).

The hypervisor (116) allocates a receive window context ($RWC_A$) (122a) associated with work buffer (126). $RWC_A$ (122a) is provided with functionality to support management of work buffer (126). For instance, $RWC_A$ (122a) has the memory address of work buffer (126) (MA WB) (154a) and a $RWC_A$ credit (156a) which corresponds to a quantity of operations the work buffer (126) can receive in order to prevent overrun of work buffer (126). The MA WB (154a) may be the real address or the effective address of work buffer (126). In one embodiment, the MA WB (154a) is the real address of the work buffer (126) and as such does not require translation by processing core (104) before sending data to the work buffer (126). Accordingly, the hypervisor manages and supports work buffer (126).

The hypervisor (116) allocates a receive window context ($RWC_F$) (122b) associated with fault buffer (130). $RWC_F$ (122b) is provided with functionality to support management of fault buffer (130). For instance, $RWC_F$ (122b) has the memory address of fault buffer (130) (MA FB) (154b) and a $RWC_F$ credit (156b) which corresponds to a quantity of operations the fault buffer (130) can receive in order to prevent overrun of fault buffer (130). In one embodiment, the maximum value of the $RWC_F$ credit (156b) may be at least the value of the sum of the send window context credit(s) associated with all users of hardware accelerator (112). The MA FB (154b) may the real address or the effective address of fault buffer (130). In one embodiment, the MA FB (154b) is the real address of the fault buffer (130) and as such does not require translation by the processing core (104) before sending data to the fault buffer (130). Accordingly, the $RWC_F$ (122b) supports fault buffer (130).

The hypervisor (116) allocates a send window context ($SWC_F$) (122c) in order to facilitate a paste bus operation by hardware accelerator (112) to fault buffer (130). For instance, $SWC_F$ (122c) has the memory address of $RWC_F$ (122b) (MA $RWC_F$) (154c) and a $SWC_F$ credit (156c) which corresponds to a quantity of operations the hardware accelerator (112) can send to fault buffer (130) in order to prevent overrun of fault buffer (130). In one embodiment, the initial value of the $SWC_F$ credit (156c) may be at least the value of the sum of the send window context credit(s) associated with all user session(s) utilizing hardware accelerator (112). The MA $RWC_F$ (154c) may be the real address or the effective address of $RWC_F$ (122b). In one embodiment, the MA $RWC_F$ (154c) is a link to the $RWC_F$ (122b). In one embodiment, the MA $RWC_F$ (154c) is the real address of the $RWC_F$ (122b) and as such does not require translation by processing core (104) prior to accessing (e.g. reading and/or writing) the $RWC_F$ (122b). Accordingly, the $RWC_F$ (122b) facilitates a paste bus operation by hardware accelerator (112).

Similarly, the hypervisor (116) allocates (e.g. assigns) a send window context associated with user session (120) ($SWC_{us}$) (122d) to facilitate a paste bus operation to hardware accelerator (112) by user session (120). For instance, $SWC_{US}$ (122d) is configured with a partition send window context identifier (PSWID) (180) which provides an identifier for the associated user session, user session (120). The hypervisor (116) records PSWID to SWC identifier (ID) assignments provided to the OS (118) in a PSWID to SWC ID Table (186). For example, the hypervisor (116) records an entry assigning the identifier of $SWC_{us}$ (122d) to a PSWID (180) provided to the OS (118) in the PSWID to SWC ID Table (186). $SWC_{US}$ (122d) is configured with a memory address of $RWC_A$ (122a) (MA $RWC_A$) (154c) and a user session credit (156d) which corresponds to a quantity of operations user session (120) can send to hardware accelerator (112) (e.g. a number of operations that the user session can have in flight). $SWC_{US}$ (122d) is configured with an identifier for an associated send window context for a fault buffer, such as $SWC_F$ (122c) and ($SWC_F$ ID) (158). The associated fault buffer is used to resolve a fault memory address translation associated with user session (120). The MA $RWC_A$ (154d) may be the real address or the effective address of the $RWC_A$ (122a). In one embodiment, the MA $RWC_A$ (154d) is a link to the $RWC_A$ (122a). In one embodiment, the MA $RWC_A$ (154d) is the real address of the $RWC_F$ (122b) and as such does not require translation by the processing core (104) prior to accessing (e.g. reading and/or writing) the $RWC_F$ (122b). Accordingly, the $SWC_{US}$ (122b) facilitates a paste bus operation by user session (120).

User session (120) may communicate with the OS (118) to request a hardware accelerator, such as hardware accelerator (112), which can be utilized by the user session (120). The OS (118) in turn communicates with hypervisor (116) which creates the $SWC_{US}$ (122d). The hypervisor (116) assigns an effective address (EA $SWC_{US}$) that when mapped to a real address (e.g. via page table (128)) identifies $SWC_{US}$ (122d) and the hypervisor (116) configures the $SWC_{US}$ (122d) with a unique PSWID (180) for the user session (120). The hypervisor communicates the effective address, EA $SWC_{us}$, and PSWID (180) to the OS (118) which creates an entry in the PSWID to effective address (EA) table (124). The created entry associates the effective address, EA $SWC_{US}$, for a paste operation by user session (120) with the unique PSWID (180) created for user session (120). OS (118) provides the effective address, EA $SWC_{US}$, to user session (120) to be used in a paste operation to initiate execution of a CRB by the hardware accelerator (112). Accordingly, the user session (120) is enabled to utilize the hardware accelerator (112) to execute the CRB.

In order to provide the CRB to the hardware accelerator (112), a paste bus operation is executed by the user session (120) and is supported by processing core (104). For instance, the user session (US) (120) sends a copy operand to processing core (104) with the effective address of CRB (136) in memory, such as memory (106). Processing core (104) receives the effective address of CRB (136), translates the effective address to a real address for CRB (136), and loads CRB (136) into buffer (184) from memory (106) utilizing the real address for CRB (136). User session (120) utilizes a paste operation including a paste operand defining the effective address, EA $SWC_{US}$, provided by the OS (118) for the destination address of a paste operation. The processing core (104) translates the effective address, EA $SWC_{US}$, to a real address, RA $SWC_{US}$. The real address, RA $SWC_{us}$, includes an identifier for $SWC_{US}$ (122d) associated with user session (120). Processing core executes the paste operation utilizing buffer (184) including pasting the CRB (136) loaded into buffer (184) and the real address, RA $SWC_{US}$, onto bus (108). Accordingly, the CRB (136) is copied to buffer (184) and pasted onto bus (108) with the identifier of $SWC_{US}$ (122d) as the destination.

The accelerator switchboard (110) is configured to monitor (e.g., snoop, etc.) bus (108) and identify any pasted CRB on bus (108) including an identifier in a real address associated with the pasted CRB, such as an identifier for the $SWC_{US}$ (122d). Responsive to the identification of the identifier, the accelerator switchboard (110) determines whether the accelerator switchboard (110) should accept the pasted CRB (136) from bus (108). For example, accelerator switchboard (110) examines hypervisor (116) in memory (106) to determine if the $SWC_u$s (122d) from bus (108) is valid. If the identifier of the $SWC_{US}$ (122d) is invalid the accelerator switchboard (110) does not accept the pasted CRB. If the identifier of the $SWC_{US}$ (122d) is valid, the accelerator switchboard (110) examines $SWC_{US}$ (122d) including the value of $SWC_{US}$ credit (156d) to determine if the user session (120) associated with the CRB (136) has a credit available to send an operation to the work buffer (126). The $SWC_{US}$ credit (156d) is an indicator that conveys if the user session (120) is allowed to send the CRB (136) to the work buffer (126). In addition, the accelerator switchboard (110) extracts the MA $RWC_A$ (154d) from $SWC_{US}$ (122d) in order to determine which receive window context is linked to $SWC_{US}$ (122d). For example, the accelerator switchboard (110) determines the receive window context is $RWC_A$ (122a) and the accelerator switchboard examines the $RWC_A$ credit (156a) within $RWC_A$ (122a) to determine if the linked $RWC_A$ (156a) has credit available to receive a CRB. If both the $SWC_{US}$ credit (156d) and $RWC_A$ credit (156a) are determined to have an available credit, the operation is allowed to proceed and the accelerator switchboard (110) accepts the pasted CRB (136) from bus (108). If either the $SWC_{US}$ credit (156d) or $RWC_A$ credit (156a) are determined to not have an available credit, the accelerator switchboard (110) does not accept the pasted CRB (136) from bus (108). Responsive to the non-acceptance of the pasted CRB (136), the user session (120) may re-attempt the paste operation. In one embodiment, the user session (120) re-attempts the paste operation until a pre-determined threshold of attempt(s) is met or exceeded and thereafter meeting or exceeding the pre-determined threshold of attempt(s) the execution of the CRB (136) is delegated to software in memory (106) for execution by processing core (104). Accordingly, the accelerator switchboard (110) examines the pasted CRB from processing core (104) and based on the examination determines if the accelerator switchboard (110) should accept the paste.

Responsive to acceptance of the pasted CRB (136), the accelerator switchboard (110) extracts the memory address of the work buffer, such as MA WB (154a), associated with the $RWC_A$ (122a) and forwards the received CRB (136) to work buffer (126) by a memory write operation in accordance with the MA WB (154a). The forwarding includes the accelerator switchboard (110) augmenting the CRB (136) with an identifier of the $SWC_{US}$ (122d). The memory write operation creates entry (146) containing augmented CRB (136) in work buffer (126). After the entry is created in the work buffer (126), the accelerator switchboard (110) decrements both the $SWC_{US}$ credit (154d) and the $RWC_A$ credit (154a). In one embodiment, the $RWC_A$ (122a) contains one or more parameters that define how a paste to the work buffer is to be processed. In accordance with the $RWC_A$ (122a), the accelerator switchboard (110) instructs the hardware accelerator (112) to process the CRB (136) (e.g. unit of work) that has been added to the work buffer (126). Accordingly, the accelerator switchboard (110) forwards one or more CRBs to work buffer (126) based on one or more send/receive window contexts, and in one embodiment, limits the quantity of operations in the work buffer (126).

Server$_0$ (102) is shown with the hardware accelerator (112) in communication with the processing core (104) and memory (106) across bus (108) to support execution of instructions by the processing core (104). The hardware accelerator (112) is configured with circuitry to implement one or more operations, such as operation (148), without the use of processing core (104). The hardware accelerator (112) may be controlled by software to perform an operation on input data to produce output data that can be read by software. For example, the hardware accelerator (112) may be configured to accept commands generated by software that identify a select operation, the source data for the operation, and the target data for the operation. In one embodiment, hardware accelerator (112) may be used for, but is not limited to, virtual memory paging, memory address translation fault support, cryptographic tasks, extensible markup language (XML) processing tasks, compression/decompression, and network processing tasks. In one embodiment, server$_0$ (102) may be provided with a plurality of hardware accelerators. The quantity of hardware accelerator(s) is for illustration purposes only and should not be considered limiting. Accordingly, the hardware accelerator (112) enables operations to be implemented in hardware and reduces the workload of processing core (104).

The hardware accelerator (112) is configured to pull a CRB from entry (146) within work buffer (126) and store the CRB (174) within the hardware accelerator (112). In one embodiment, the pulling of the CRB is responsive to an instruction from the accelerator switchboard (110). After the CRB (174) is received by the hardware accelerator (112), the hardware accelerator (112) increments the RWC$_A$ credit (156a). The received CRB (174) has been augmented with an identifier (182). In one embodiment, the identifier (182) is the identifier of the SWC$_{US}$ (122d). Based on the identifier (182) of the SWC$_{US}$ (122d), the hardware accelerator examines the SWC$_{US}$ (122d) in hypervisor (116) in memory (106) to determine one or more parameters for the processing. The parameter(s) may be, but is not limited to, a translation parameter, a fault resolution parameter, and a PSWID (180). The hardware accelerator (112) processes the CRB (174) including operation (176) by referencing at least one pointer (178) in accordance with the parameter(s). The hardware accelerator extracts an effective address from the referenced pointer (178). Accordingly, the hardware accelerator (112) initializes processing of CRB (174).

The hardware accelerator (112), supported by the nest memory management unit (NMMU) (114), performs an effective address to real address (EA/RA) translation on the effective address extracted from CRB (174). The NMMU (114) is provided with a plurality of state machines known as table walkers, including table walker (134), in order to support EA/RA translation. A table walker is hardware that is activated by the NMMU (114) to search page table (128). The table walker (134) walks through the page table (128) in order to find an entry corresponding to the effective address within entry (148). If a corresponding entry is found for the EA/RA translation in the page table (128) by table walker (134), the table walker (134) extracts the real address from the matching entry within page table (128). The NMMU (114) transmits the real address from the matching entry in the page table (128) utilizing hardware without software intervention to the hardware accelerator which creates an effective to real address translation entry (148) within the effective address to real address translation table (ERAT) (132), with the entry including the extracted effective address and the matching real address. Accordingly, the NMMU (114) supports EA/RA translation by examining the page table (128) for a matching entry.

In one embodiment, pointer (178) references the memory location of the CSB (138) corresponding to the CRB (174). The hardware accelerator (112) obtains an EA/RA translation for the CSB (138) utilizing the NMMU (114) and pages tables (128) as described above. After the processing of CRB (174) is complete, the hardware accelerator (112) changes the status of the CSB (138) to complete based on the real address from the EA/RA translation, the hardware accelerator (112) selects the SWC$_{US}$ (122d) based on the identifier (182), and increments the SWC$_{US}$ credit (156d) within SWC$_{US}$ (122d). Accordingly, the hardware accelerator (112) performs the EA/RA translation supported by NMMU (114) and page table (116) to minimize latency of the instruction(s) execution by processing core (104).

The process described above addresses a non-faulting EA/RA translation. If however an address translation fault occurs, the address translation fault is returned to the NMMU (114) and transmitted to the hardware accelerator (112). The address translation fault may be due to, but is not limited to, a page fault and an exception. The page fault may occur when a requested page of the virtual storage corresponding to the effective address supplied by the CRB (174) has been swapped out to physical storage and the requested page has to be brought back into virtual storage before the translation request can successfully complete. The page fault may occur when TW (134) searches page table (128) and cannot find a matching entry. An exception may be write access attempted to read-only memory. The exception may occur when TW (134) searches page table (128) and finds a matching entry but, the entry is for read access only when EA/RA translation requires write access. Accordingly, if a page fault or an exception occurs, an address translation fault is communicated to the hardware accelerator (112).

When the hardware accelerator (112) encounters an address translation fault during execution of the operation, the hardware accelerator (112) halts execution of the operation (176) in the CRB (174). The hardware accelerator (112) flushes the CRB (174) including the operation (176) and the address translation fault from the hardware accelerator (112). The hardware accelerator (112) augments the CRB with fault information (152) corresponding to the address translation fault. The fault information may be used in a paste bus operation to retry execution of the operation within the CRB on the hardware accelerator (112) after the address translation fault has been repaired. In one embodiment, the augmenting includes an overwrite and/or removal of the identifier (182) from the CRB (174). The hardware accelerator (112) pastes the CRB augmented with fault information (152) associated with the address translation fault (e.g. faulting CRB) onto bus (108) utilizing a paste bus operation with the send window context for a corresponding fault buffer, e.g. SWC$_F$ ID (158) as defined in SWC$_{US}$ (122d), as the destination for the paste. The SWC$_F$ ID (158) is utilized to direct the faulting CRB to the fault buffer associated with the identifier (182). Accordingly, responsive to the address translation fault the CRB is flushed from the hardware accelerator (112) and augmented with fault information that supports repairing of the address translation fault.

Figure 2:
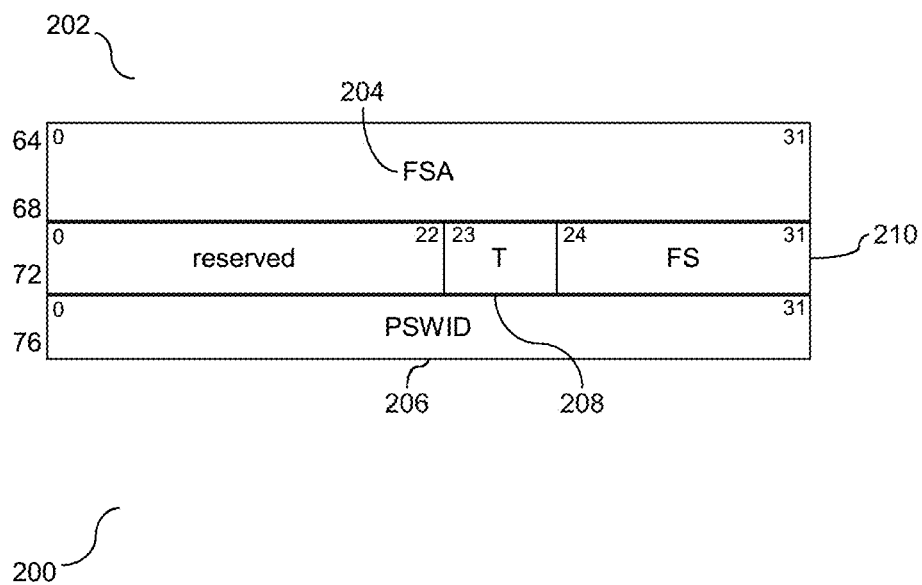
FIG. 2 depicts a block diagram illustrating address translation fault information augmented to a co-processor request block.
Figure 3A:
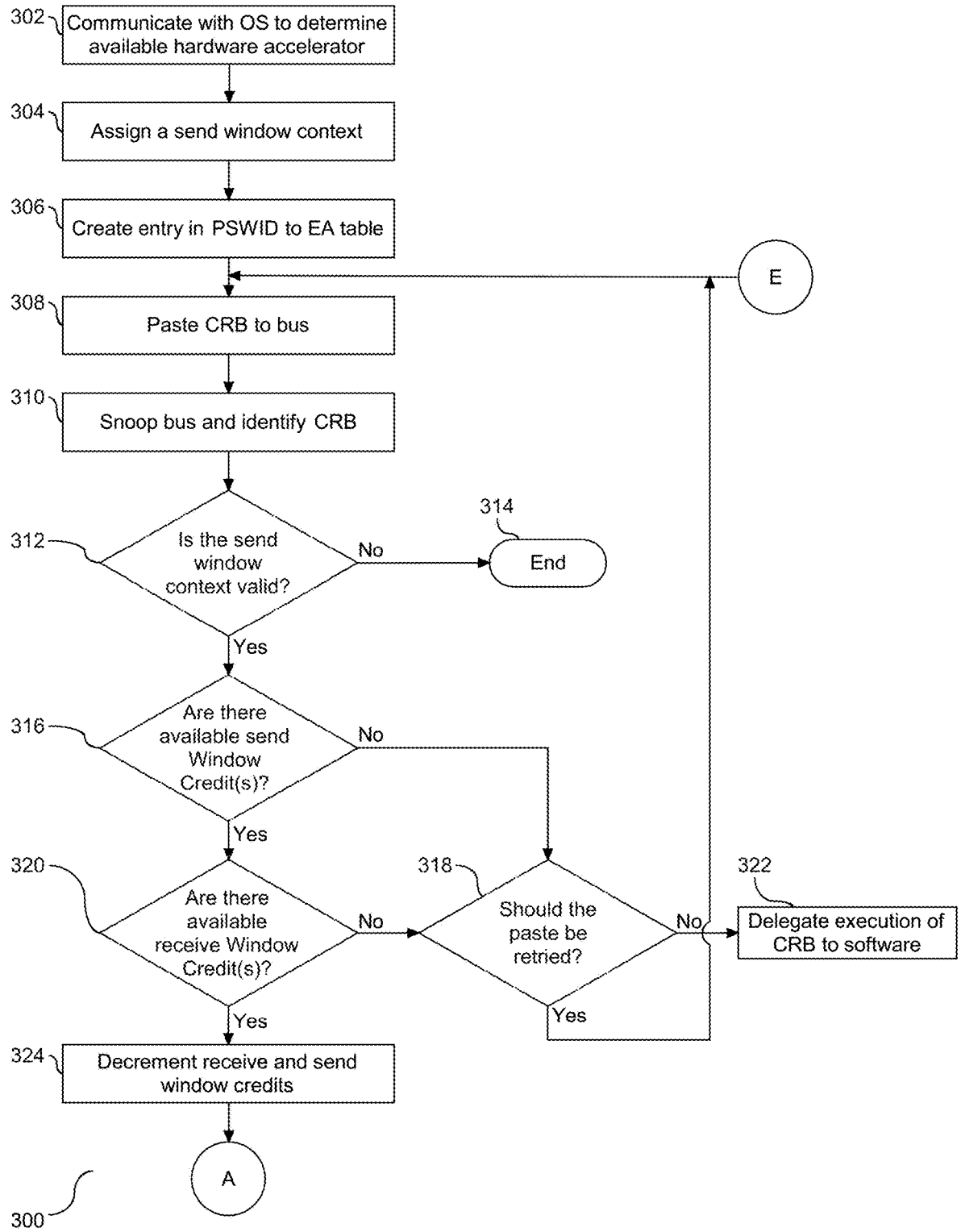
FIGS. 3A-D depicts a flow chart illustrating a process for address translation fault resolution utilizing hardware components.
Figure 3B:
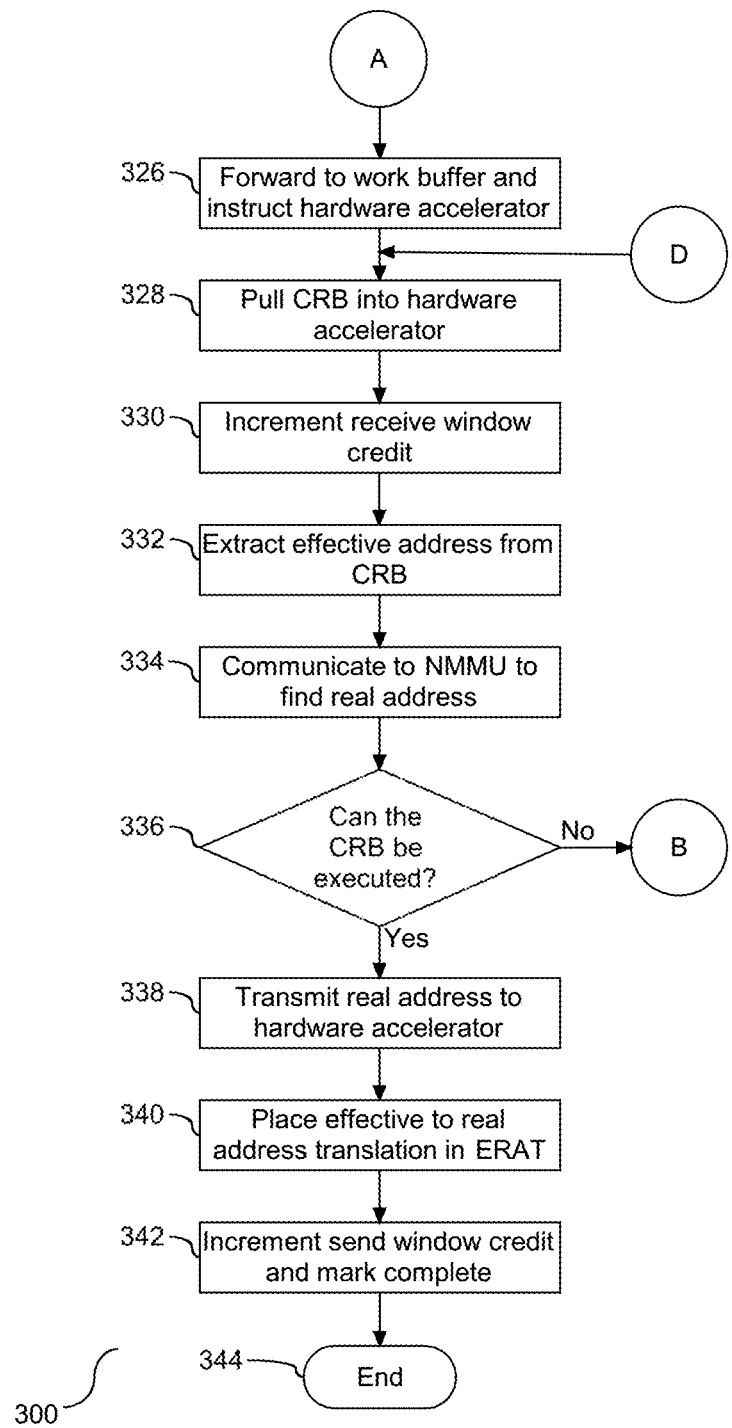
Figure 3C:
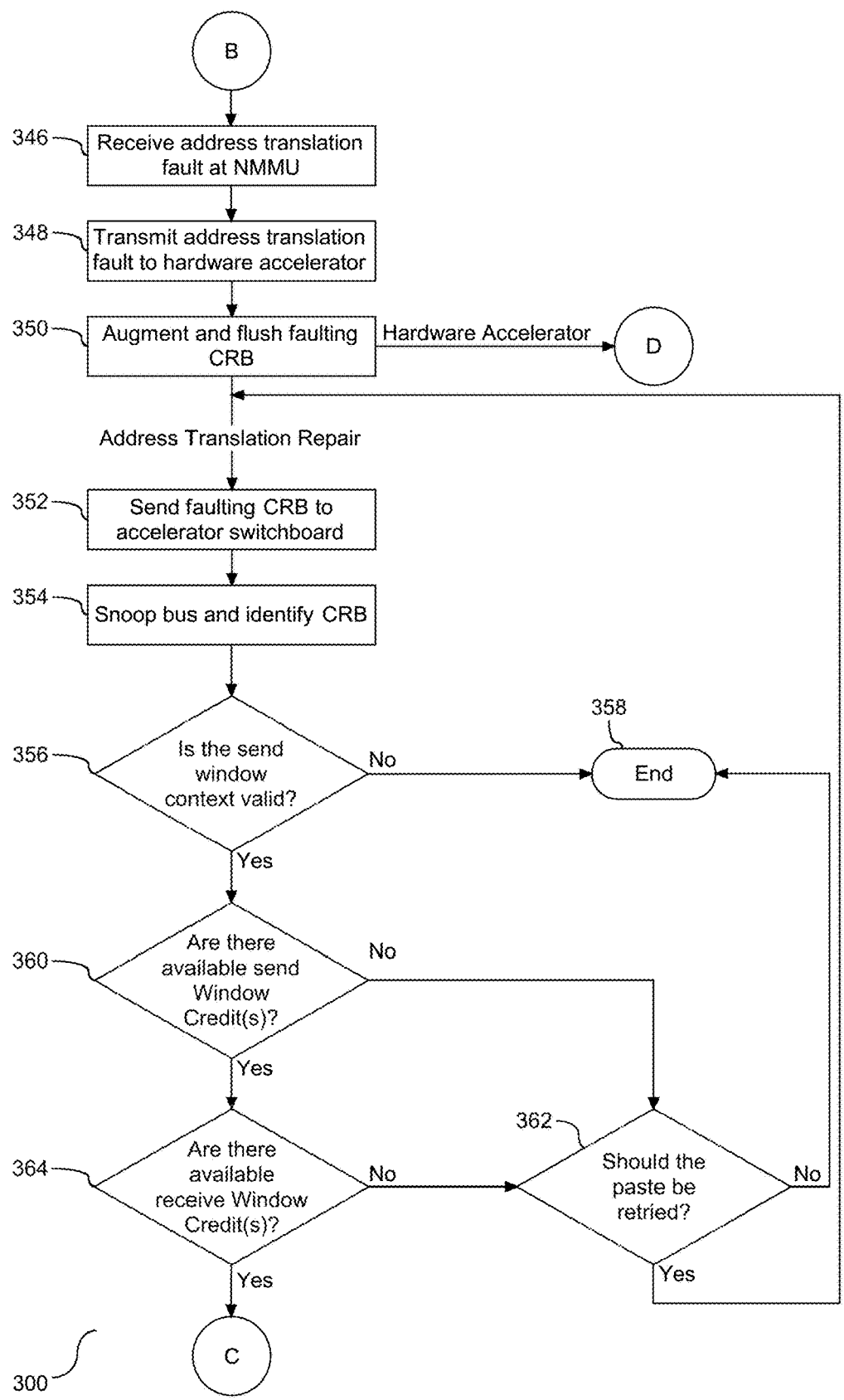
Figure 3D:
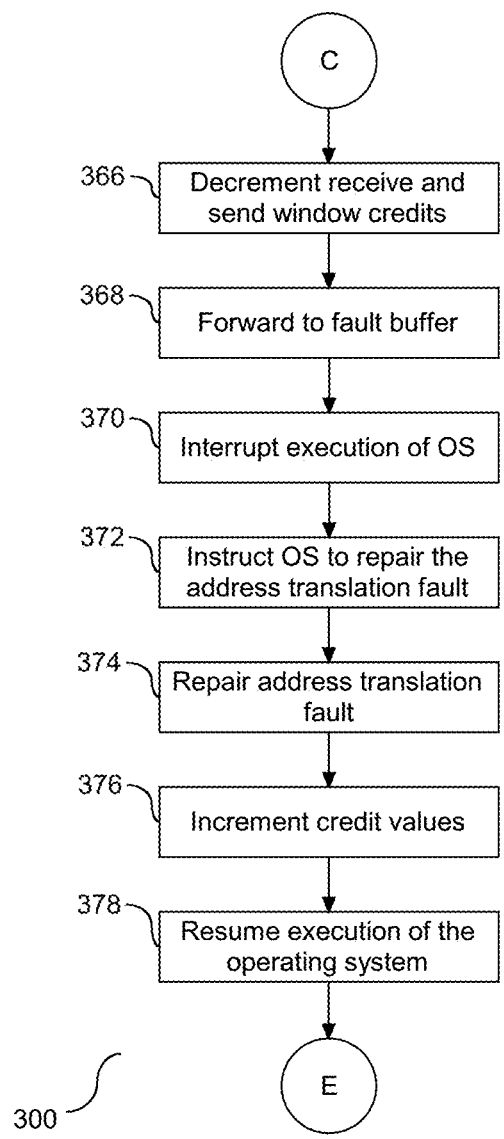

Referring to FIG. 2, a block diagram (200) is provided illustrating address translation fault information augmented to the CRB. As shown, the CRB (202) has been flushed from the hardware accelerator (112) and augmented with fault information. Augmentation of the CRB (202) includes modifying the CRB (202) to include the fault information in addition to the CRB (202) flushed from the hardware accelerator (112). The fault information may be, but is not limited to, a faulting storage address (FSA) (204), a fault status code (FS) (210), an access type (T) (208), and a partition send window identifier (PSWID) (206). The PSWID (206) is a unique identifier for the entity which sent the CRB and provides information corresponding to a destination for the CRB. The PSWID (206) may be retrieved from a send window context associated with the entity which sent the CRB. The OS that repairs the address translation fault utilizes the PSWID (206) to determine the effective address of the destination to paste the CRB after the address translation fault has been repaired. The PSWID may be utilized for a table look-up within the PSWID to EA table (124) to determine the effective address corresponding to the user session that originally pasted the CRB, such as EA SWC$_{US}$. The FSA (204) designates which effective address could not be resolved when the NMMU (114) examined the page table (128) with TW (134). The access type (208)

designates whether the FSA (204) was accessed for a read command or a write command. For instance, an access type (208) of 0 may indicate read and an access type (208) of 1 may indicate write, or in one embodiment this may be reversed with the access type (208) of 0 indicating write and the access type (208) of 1 indicating read. The fault status code indicates the type of fault that occurred. For example, a fault state code (210) may be, but is not limited to, a page fault and an exception. In one embodiment, the CRB (202) has been augmented by the hardware accelerator (112) in a format type, such as quadword 4. Accordingly, the repair of the address translation fault is supported by the fault translation information.

Referring back to FIG. 1, the flushing of the CRB (174) including the operation (176) corresponding to the address translation fault enables the hardware accelerator (112) to pull a second CRB from a second entry within work buffer (126). The hardware accelerator (122) examines a send window context based on an identifier in the second CRB. An effective address(es) is extracted from pointer(s) referenced by the second CRB pulled in from work buffer (126) and is stored in one or more entries within ERAT (132), such as entry (148). Responsive to pulling in the second CRB, the hardware accelerator (112) increments $RWC_A$ credit (156a). In one embodiment, after the second CRB is within hardware accelerator (112), the hardware accelerator (112) executes a second operation within the second CRB during the repair of the faulting CRB. In one embodiment, the second operation does not cause an address translation fault (e.g. non-faulting). In one embodiment, the second operation does cause a second address translation fault and the second CRB, including the second operation and second address translation fault, is flushed from the hardware accelerator (112). Accordingly, an operation having an EA/RA translation that encounters an address translation fault is flushed from the hardware accelerator (112) to enable the hardware accelerator (112) to continue execution of operation(s) within CRB(s) in the work buffer (126).

The accelerator switchboard (110) monitors (e.g. snoops, etc.) bus (108) and identifies the pasted faulting CRB (174) on bus (108) including the $SWC_F$ ID (158). The accelerator switchboard (110) determines whether the accelerator switchboard (110) should accept the pasted faulting CRB (136) from bus (108). The accelerator switchboard (110) extracts the $SWC_F$ ID (158) and examines hypervisor (116) in memory (106) to determine if $SWC_F$ ID (158) is valid. If the $SWC_F$ ID (158) is invalid the accelerator switchboard (110) does not accept the pasted faulting CRB. If the $SWC_F$ ID (158) is valid, the accelerator switchboard (110) examines the value of $SWC_F$ credit (156c) to determine if the fault buffer (120) associated with the pasted faulting CRB (174) has a credit available to send an operation to the fault buffer (130). The $SWC_F$ credit (156d) is an indicator that conveys if the hardware accelerator (112) is allowed to send the faulting CRB (174) to the fault buffer (130). In addition, the accelerator switchboard (110) extracts the MA $RWC_F$ (154c) in order to determine which receive window context and associated fault buffer is linked to $SWC_F$ (122c). The accelerator switchboard (110) determines the receive window context is $RWC_F$ (122b) based on MA $RWC_F$ (154c) and the accelerator switchboard (110) examines the $RWC_F$ credit (156b) within $RWC_F$ (122b) to determine if the associated fault buffer (130) has a credit available to receive the pasted faulting CRB. If both the $SWC_F$ credit (156c) and $RWC_F$ credit (156b) are determined to have an available credit, the operation is allowed to proceed and the accelerator switchboard (110) accepts the pasted faulting CRB (174) from bus (108). If the either $SWC_F$ credit (156c) or $RWC_F$ credit (156b) do not have an available credit the accelerator switchboard (110) does not accept the paste. Responsive to the non-acceptance of the pasted faulting CRB (174) the hardware accelerator (112) may re-attempt the paste operation. In one embodiment, the hardware accelerator (112) re-attempts the paste operation until a pre-determined threshold of attempt(s) is met or exceeded and an error is signaled to hypervisor (116). In one embodiment, the hardware accelerator (112) re-attempts the paste operation until a timer expires signaling an error to hypervisor (116). Accordingly, the pasted faulting CRB (174) is examined by the accelerator switchboard (110) and based on the examination the accelerator accepts or does not accept the pasted faulting CRB.

Responsive to acceptance of the pasted faulting CRB (174), including the fault information, the accelerator switchboard (110) forwards the received CRB (174) and fault information (152) to fault buffer (130) by a memory write operation in accordance with the MA FB (154b) stored in $RWC_F$ (122b). The memory write operation creates entry (150) containing faulting CRB (174) in fault buffer (130). After the entry is created in the fault buffer (130), the accelerator switchboard (110) decrements both the $SWC_F$ credit (154c) and the $RWC_F$ credit (154b). In one embodiment, the $RWC_F$ (122b) contains one or more parameters that define how a paste to the fault buffer is to be processed. Responsive to the receipt of the faulting CRB (174) by fault buffer (130), the accelerator switchboard (110) sends an interrupt instruction to the OS (118), in accordance with the $RWC_F$ (122b). The interrupt instruction directs the OS (118) to process the faulting CRB within entry (150) (e.g. unit of work) that has been added to the fault buffer (130), including to repair the faulting CRB. Accordingly, the accelerator switchboard (110) delegates address fault resolution to the OS (118).

The OS (118) initializes processing of the faulting CRB within entry (150) including retrieving the faulting CRB from entry (150). Upon initialization, the OS (118) utilizes a hypervisor call command to hypervisor (116) in order to increment the $SWC_F$ credit (156c) and the $RWC_F$ credit (156b). The OS (118) examines the fault information (152) attached to the faulting CRB from entry (150) of the fault buffer (130). The OS (118) repairs the address translation fault through a hypervisor call command to adjust the page table (128) based on the faulting CRB within entry (150) and fault information (152). In one embodiment, the adjustment includes creating an entry in the page table (128) for the effective address designated in the operation within fault information (152), namely FSA (204), in the faulting CRB within entry (150). After repairing the address translation fault, the OS (118) utilizes a hypervisor call command to request hypervisor (116) to increment the send window context credit(s) associated with the PSWID within fault information (152) in order to send the repaired CRB back to the hardware accelerator (112). The hypervisor (116) searches the PSWID to SWC ID table (186) to find a matching entry corresponding to the PSWID within fault information (152). From the matching entry, the hypervisor (116) determines the send window context corresponding to the source of the repaired CRB. For example, the repaired CRB has fault information (152) having a PSWID which matches an entry in PSWID to SWC ID table (186) which designates $SWC_{US}$ (122d) as the send window context. Hypervisor (116) adjusts (e.g. increments) the $SWC_{US}$ credit (156d) and returns a success notification to the OS (118).

Accordingly, the faulting CRB has been repaired by OS (118) and the repaired CRB is prepared to be re-executed by the hardware accelerator.

The OS (118) utilizes a copy operation to copy the repaired CRB from memory (106) to buffer (184) supported by processing core (104). The subsequent paste operation includes the effective address, EA $SWC_{US}$, found in the PSWID to EA table (124) based on the PSWID within fault information (152). Processing core (104) receives the found effective address, EA $SWC_{US}$, and executes a paste operation including translating the effective address, EA $SWC_{US}$, to a real address, RA $SWC_{US}$. The processing core (104) pastes the CRB loaded into buffer (184) onto bus (108) including the RA $SWC_{US}$ as the destination for the paste. The real address, RA $SWC_{US}$, includes the send window context identifier associated with the CRB, such as the identifier of $SWC_{US}$ (122d). In one embodiment, the OS (118) instructs the user session (120) associated with the PSWID in fault information (152) to perform the paste bus operation (e.g. copy operation and paste operation) in order to re-execute the CRB with the repaired address translation fault. In one embodiment, the instructions to the user session (120) from the OS (118) include an effective address of the repaired CRB. In one embodiment, the OS (118) sends the repaired CRB to a repaired CRB buffer in user session (120). In one embodiment, execution of OS (118) is resumed after repairing all address translation faults in the fault buffer (130). Accordingly, the CRB experiencing the address translation fault is repaired and sent out on bus (108) to be re-executed by the hardware accelerator.

Utilization of the PSWID to EA table (124) and a PSWID by an operating system enables live partition mobility (LPM). LPM is movement of an operating system (e.g. partition) from one hardware system (e.g. server, client) to another hardware system. In one embodiment, the send window context(s) and receive window context(s) are virtualized. When a partition, such as OS (118), is migrated from server$_0$ (102) to server$_2$ (162), or in one embodiment another server across the network (170), the PSWID to EA table (124) in the OS (118) remains unchanged. The hypervisor (not shown) of server$_2$ (162) assigns a new send window context(s) and/or receive window context(s) for the migrated partition(s) and the hypervisor of server$_2$ (162) changes the mapping in a PSWID to SWC ID (not shown) within the hypervisor of server$_2$ (162). The changed mapping in the PSWID to SWC ID includes an assignment of the new send window context(s) and/or receive window context(s) to the identifier(s) (PSWID) associated with the previous send window context(s) and receive window context(s). In one embodiment, the mapping within a page table (not shown) on server$_2$ (162) is also changed to accommodate the effective address and/or real address changes. Therefore, the same effective identifier(s) can be used in server$_2$ (162) with the change in identifiers for the send window context(s) and receive window context(s) designated in the tables of the hypervisor on server$_2$ (162).

The operating system is unaware of the migration and the fault repair can continuously process during the migration. The OS (118) utilizes the PSWID of the faulting CRB and the PSWID to EA table (124) in order to determine the effective address of the user session that sent the CRB. The identifiers of the send window context(s) and receive window context(s) may be hidden from OS (118). Upon translation of the effective address to real addresses utilizing the page table in the hypervisor of server$_2$ (164), the identifiers for the new send window context(s) and receive window context(s) are returned with the real addresses to the requesting entity (e.g. processing core (104) and TW (134)). In one embodiment, changes to facilitate LPM are limited to the hypervisor and the operating system remains unchanged. Accordingly, LPM is enabled by virtualization of the identifiers utilized to refer to a send and/or receive window context(s) and the PSWID to EA table (124).

FIG. 1 illustrates the hardware components employed to support the address fault resolution with respect to the hardware accelerator and FIG. 2 illustrates fault information used by the hardware components. Referring to FIGS. 3A-D, a flow chart (300) is provided illustrating a process for the address translation fault resolution utilizing the illustrated hardware components. As shown, an entity communicates with an operating system (OS) to determine an available hardware accelerator (302). In response to the communication, the OS communicates with a hypervisor which determines the available hardware accelerator and assigns an effective address (EA $SWC_{US}$) that when mapped to a real address (e.g. via a page table in the hypervisor) identifies a send window context for the entity. The hypervisor configures the send window context for the entity with a partition send window identifier (PSWID) for the entity (304). The PSWID and the effective address, EA $SWC_{US}$, is communicated to the OS, the OS in turn communicates the effective address, EA $SWC_{US}$ to the entity, and the OS creates an entry in a PSWID to effective address (EA) table corresponding to the EA $SWC_{US}$ and the PSWID for the entity (306). The entity, supported by a processing core, sends a co-processor request block (CRB) to a bus in communication with an accelerator switchboard utilizing a paste bus operation (308). The paste bus operation includes utilizing a copy operation to copy the CRB from memory to a paste buffer and a paste operation to paste the CRB from the paste buffer to a bus with an identifier of the send window context for the entity. The entity may be, but is not limited to, the user session, the operating system, the hypervisor, and the hardware accelerator. The CRB contains one or more operations to be executed by the hardware accelerator. Accordingly, the CRB including one or more operations is pasted to the bus to be received by the accelerator switchboard.

The accelerator switchboard monitors the bus (e.g. snoops, etc.) and identifies the pasted CRB (310). Upon identification of the pasted CRB, a determination is made of whether the send window context associated with the identifier pasted on the bus is valid (312). If the determination at step (312) is negative and the send window context is invalid, the process concludes (314). However, if the determination is positive and the send window context is valid, a determination is made of whether credit is available to send the CRB to the hardware accelerator (316). The determination includes examining a send window context assigned to the entity as designated by the identifier pasted on the bus and examining a send window credit value. If the determination at step (316) is negative, the pasted CRB is not accepted and the process proceeds to step (318). However, if the determination at step (316) is positive, a determination is made of whether the work buffer has a credit available to receive the CRB (320). The determination includes examining a receive window context of a work buffer linked to the send window context assigned to the entity and examining a receive window credit value within the receive window context of the work buffer. If the determination at step (320) is negative, the pasted CRB is not accepted and the process proceeds to step (318). However, if the determination at step (320) is positive, the pasted CRB is accepted, the send window credit value and receive window credit value are decremented (324). The CRB is forwarded to the work buffer by a memory write operation, and the hardware accelerator is instructed that the CRB has been added to the work buffer (326). As demonstrated herein, the determinations at steps (316) and (320) are employed to prevent buffer overrun. Accordingly, prior to processing the CRB, a determination is made if the CRB can be sent to be processed by the hardware accelerator.

As shown, following a negative determination at step (316) and (320), a determination is made of whether the CRB paste should be re-attempted (318). In one embodiment, the determination includes determining if the attempts to paste the CRB have met or exceeded a pre-determined threshold of attempts. For instance, if the paste attempt(s) are below the pre-determined threshold of attempts the determination is positive and if the attempt(s) have met or exceeded the pre-determined threshold of attempts the determination is negative. Upon a positive determination at step (318) the process returns to step (316) to re-attempt the pasting of the CRB. If the process is negative at step (318), the execution of the CRB is delegated to software in memory supported by a processing core. In one embodiment, the delegated CRB at step (322) will not be processed by the hardware accelerator. Accordingly, the pasting of the CRB may be re-attempted or execution of the CRB may be delegated to software.

Following the instruction that the CRB has been added to the work buffer at step (326), the hardware accelerator pulls in the CRB from the work buffer (328). The receive window credit value is incremented (330). Based on a pointer in the CRB, the hardware accelerator extracts an effective address (e.g. virtual address) to be translated into a real address (e.g. physical address) (332). In order to translate the extracted effective address into a real address (e.g. EA/RA translation), the hardware accelerator communicates with the nest memory management unit (NMMU) to support the EA/RA translation (334). The NMMU utilizes one or more table walkers in order to determine whether the EA/RA translation for the received effective address can be executed (e.g. present in an entry in a page table associated with the hardware accelerator and an exception does not occur) (336). If the determination at step (336) is positive and the address translation can be executed (e.g. matching entry), the process proceeds to step (338). However, if the determination at step (336) is negative and the address translation has incurred an address translation fault, the process proceeds to an address translation resolution process that begins at step (346). Accordingly, upon extraction of an effective address, a determination of whether the effective address can be translated by the hardware accelerator as supported by the NMMU is made.

As shown, following a positive response to the determination at step (336), the real address matching the effective address from the page table is transmitted to the hardware accelerator (338). Following the transmission, the retrieved effective address and the matching real address are placed in the ERAT to complete the address translation (340). After completing the CRB execution, the send window credit value is incremented, the CRB is marked complete (342), and the process concludes (344). Accordingly, the CRB is processed and the credit values are incremented after processing.

As shown, if the EA/RA translation is not found in the page table at step (336), the NMMU receives an address translation fault (346). In one embodiment, the address translation fault is received from the table walker. The address translation fault is transmitted from the NMMU to the hardware accelerator (348). In response to the address translation fault, the CRB corresponding to the address translation fault (e.g. faulting CRB) is augmented with fault information and the faulting CRB and address translation fault are flushed from the hardware accelerator (350). The flushing of the faulting CRB and address translation fault at step (350) enables the hardware accelerator to return to step (328) and pull in a second CRB from the work buffer during repair of the faulting CRB starting at step (352). In one embodiment, the second CRB is executed and an address translation fault does not occur. In one embodiment, the second CRB is executed and a second address translation fault does occur wherein the second CRB and second address translation fault are flushed from the hardware accelerator. Accordingly, the flushing of the faulting CRB including the operation and the address translation fault enables the hardware accelerator to execute a second operation during the repair of the fault address translation.

To commence repair, the accelerator switchboard monitors the bus (e.g. snoops, etc.) and identifies the pasted faulting CRB (354). Upon identification of the pasted faulting CRB, a determination is made of whether the send window context associated with the identifier pasted on the bus is valid (356). If the determination at step (356) is negative and the send window context is invalid, the process concludes (358). In one embodiment, the process conclusion at step (358) includes an error indication in the hypervisor. However, if the determination is positive and the send window context is valid, a determination is made of whether a credit is available to send the CRB to the fault buffer (360). The determination includes examining a send window context associated with the hardware accelerator as designated by the identifier pasted on the bus which includes examining a send window credit value within the send window context associated with the hardware accelerator. If the determination at step (360) is negative, the pasted faulting CRB is not accepted and the process proceeds to step (362). However, if the determination at step (360) is positive, a determination is made of whether the fault buffer has a credit available to receive the CRB (364). The determination includes examining a receive window context of the fault buffer linked to the send window context associated with the hardware accelerator, including examining a receive window credit value within the receive window context of the fault buffer. If the determination at step (364) is negative, the pasted faulting CRB is not accepted and the process proceeds to step (362). However, if the determination at step (364) is positive, the send window credit value for the hardware accelerator and receive window credit value for the fault buffer are decremented (366), the faulting CRB is forwarded to the fault buffer by a memory write operation (368). As shown, the determinations at steps (360) and (364) are employed to prevent buffer overrun. In one embodiment, since the faulting CRB is still being processed by the system the send window credit value of the send window context assigned to the user is not incremented. Accordingly, prior to repairing the faulting CRB, a determination is made if the CRB can be sent to the fault buffer.

As shown, following a negative determination at step (360) and (364), a determination is made of whether the faulting CRB paste should be re-attempted (362). In one embodiment, the determination includes determining if the attempts to paste the faulting CRB have met or exceeded a pre-determined threshold of attempts. For instance, if the paste attempt(s) are below the pre-determined threshold of attempts the determination is positive and if the attempt(s) have met or exceeded the pre-determined threshold of attempts the determination is negative. Upon a positive determination at step (362) the process returns to step (352) to re-attempt the pasting of the faulting CRB. If the process is negative at step (362), the process concludes (358). Accordingly, the pasting of the faulting CRB may be re-attempted by the hardware accelerator.

Following the forwarding of the faulting CRB to the fault buffer at step (368), the operating system is interrupted (370) and instructed to repair the fault address translation (372). The operating system repairs the fault memory address translation corresponding to the faulting CRB (374). In one embodiment, the repairing utilizes a hypervisor call to adjust the page table. The send window credit value of the entity is incremented, the send window credit value of the hardware accelerator is incremented, and the receive credit value of the fault buffer is incremented (376). In one embodiment, following the adjustment of the credit values, execution of the operating system resumes (378), e.g. returns to an executing state. Following step (378) the process returns to step (308) and pastes the repaired CRB to the bus using the effective address of the destination for the paste retrieved from the PSWID to EA table. Accordingly, the CRB with the address translation fault is repaired and sent back to the accelerator switchboard for processing.

Figure 4:
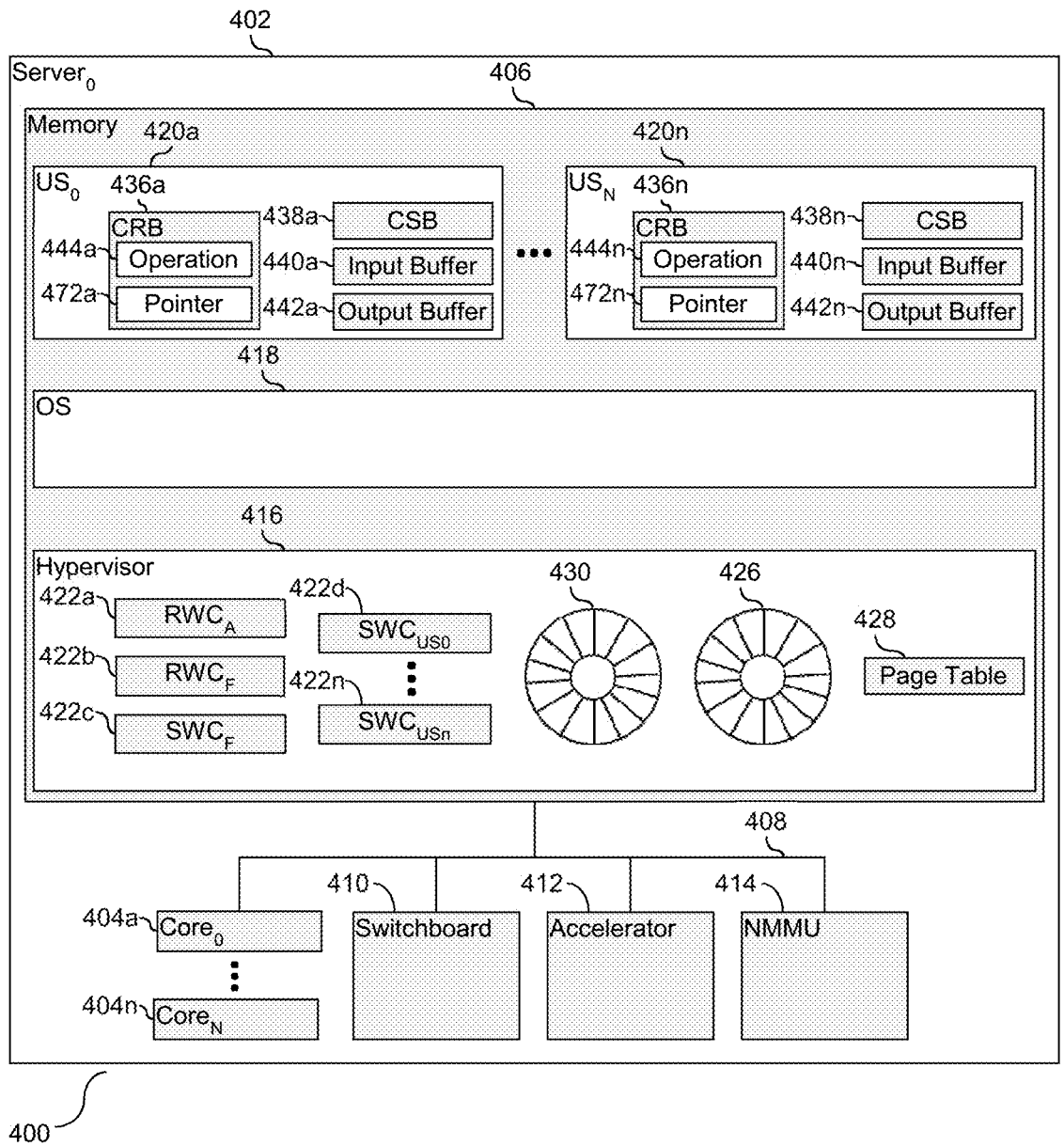
FIG. 4 depicts a block diagram illustrating a computer system that supports hardware accelerator address fault resolution in an environment with a plurality of user sessions.

Referring to FIG. 4, a block diagram (400) is provided illustrating a computer system that supports hardware accelerator address fault resolution in an environment with a plurality of user sessions. As shown a server, server$_0$ (402), is shown configured with a plurality of processing cores (404a-n) in communication with memory (406) across a bus (408). A hardware accelerator (412) is configured in communication with the processing cores (404a-n) across bus (408). The hardware accelerator (412), supported by the nest memory management unit (NMMU) (414), performs an effective address to real address (EA/RA) translation. Accordingly, the hardware accelerator (412) is shared by processing cores (404a-n).

As shown, a hypervisor (416) is embedded within memory (406) to support hardware virtualization and one or more operating systems (OS), including OS (418). The hypervisor (416), as supported by page table (428), virtualizes memory (406). The OS (418) supports a plurality of user sessions, including user sessions (420a-n). The user sessions (420a-n) each have one or more processes having one or more instructions to be executed by processing cores (404a-n). Each instruction for execution by the processing cores (404a-n) may have one or more operations to be executed by hardware accelerator (412). A plurality of operations, such as operations (444a-n), is stored in a plurality of co-processor request blocks (CRBs) (436a-n) in the respective effective address space of user sessions (420a-n). The CRBs (436a-n) each have at least one pointer (472a-n) that is a data object which references another location in memory (406). For example, pointers (472a-n) may reference a respective input buffer (440a-n). Similarly, pointers (472a-n) may reference a respective output buffer (442a-n). Additionally, pointers (472a-n) may reference a respective co-processor status blocks (CSBs) (438a-n) which have a completion status of the respective operations (444a-n) in CRBs (436a-n). Accordingly, each user session (420a-n) may be provided with a respective CRB (436a-n) for execution by hardware accelerator (412).

As shown, an accelerator switchboard (410) is provided to support forwarding of a paste bus operation to a work buffer (426) or a fault buffer (430). In one embodiment, the work buffer (426) is a (circular) first-in-first-out-buffer (FIFO). In one embodiment, the fault buffer (430) is a (circular) FIFO buffer. The paste bus operation to the work buffer (426) may be, but is not limited to, a hardware accelerator job request comprising a CRB from a user session (e.g. user sessions (420a-n)), OS (418), or hypervisor (416). The work buffer (426) is embedded within hypervisor (416) and is provided with a plurality of entries to store a CRB, such as CRBs (436a-n) including operations within the CRB such as operation (444a-n). The paste bus operation to the fault buffer (430) may be a faulting CRB sent from the hardware accelerator (412) that has incurred an address translation fault. The fault buffer (430) may be in the hypervisor (416). In one embodiment, the fault buffer (430) is in the OS (418). Accordingly, the accelerator switchboard (410) facilitates execution and/or fault resolution of CRBs from user sessions (420a-n).

The accelerator switchboard (410) is supported by one or more send window context(s) and receive window context(s) in the hypervisor (416). In one embodiment, the hypervisor (416) may be configured with a single send window context for all user sessions (420a-n) (SWC$_{US0}$) (422d) which supports management of CRB(s) sent by the user sessions (420a-n), including management of a quantity of CRB(s) that can be sent by all user sessions (420a-n) as a whole. In one embodiment, the hypervisor (416) is configured with a plurality of send window contexts of user sessions (420a-n) (SWC$_{US0}$-SWC$_{USn}$) (454d-n) which respectively support individual management of each user session (420a-n), including management of a quantity of CRB(s) that can be sent by each user session (420a-n) individually. In one embodiment, two or more of user sessions (420a-n) share one send window context (422a-n). The quantity of send window credits contexts for user sessions is for illustration and should not be considered limiting. The hypervisor (416) is configured with a receive window context for hardware accelerator (412) (RCW$_A$) (422a), which manages the quantity of operations the work buffer (426) can receive. In one embodiment, the hypervisor (416) is configured with a receive window context for fault buffer (430), which manages the quantity of operations the fault buffer (430) can receive. In one embodiment, the hypervisor (416) is configured with a send window context for hardware accelerator (412) (SWC$_F$) (422c), which manages the quantity of operations the hardware accelerator (412) can send to the fault buffer (430). In one embodiment, the window contexts are used to limit the amount of operations sent by a select user session(s) and received by a select work buffer and/or a select fault buffer in order to prevent buffer overrun. Accordingly, the window contexts (422a-n) supports the accelerator switchboard (410) by tracking the quantity of operations sent by a user session and received by work buffer (426) and fault buffer (430).

Figure 5:
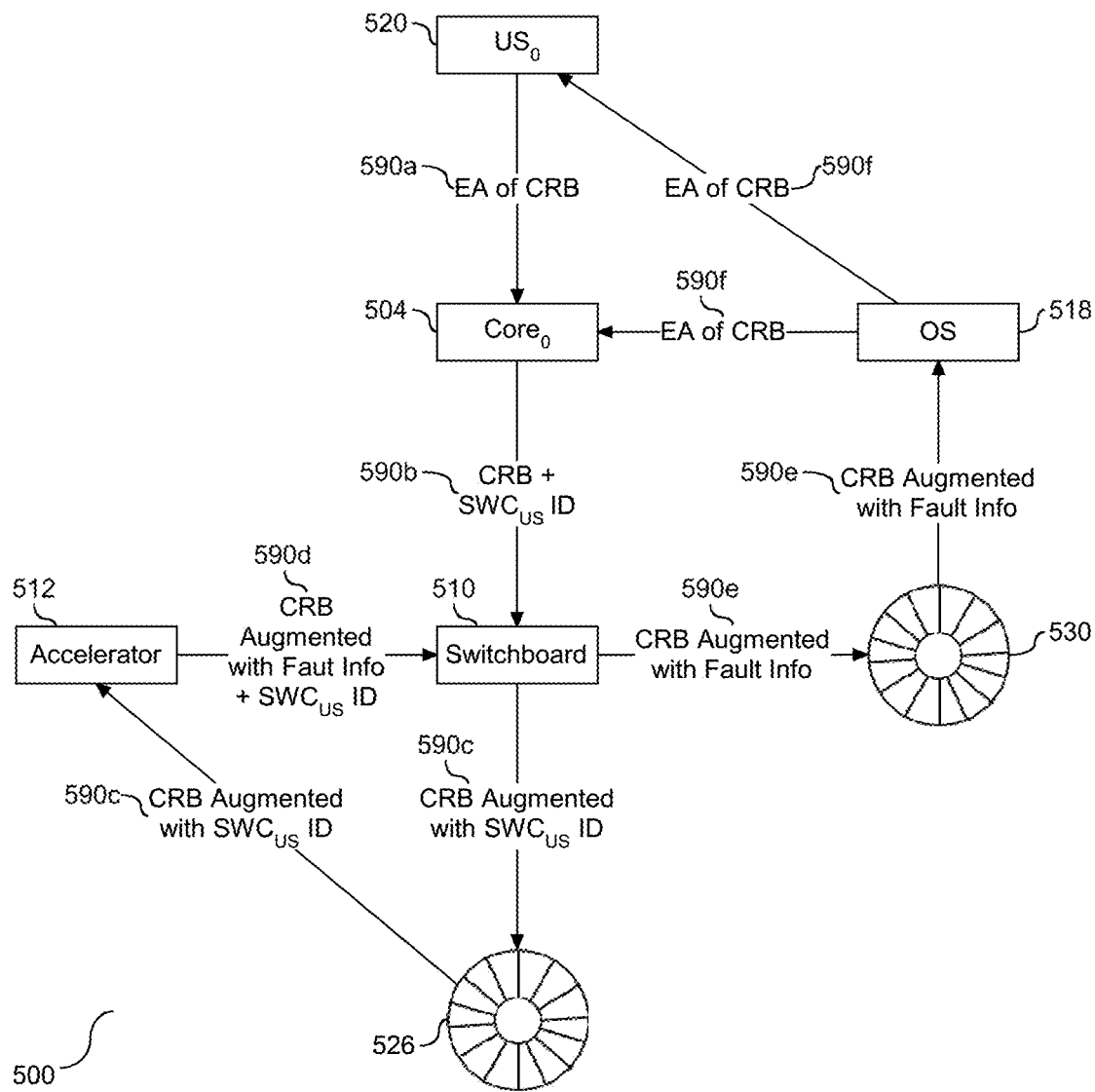
FIG. 5 depicts a block diagram illustrating address translation fault resolution supported by one or more hardware components.

Referring to FIG. 5, a block diagram (500) is provided illustrating address translation fault resolution supported by one or more hardware components. As shown a user session (520) sends the effective address (EA) of a co-processor request block (CRB) (590a) to a processing core (504). The processing core translates the received effective address (590a) into a real address and retrieves the CRB from memory and loads it into a paste buffer. The user session (520) issues the paste operation using an effective address of a destination for the paste operation received from the OS. The processing core translates the effective address of the paste operation to a real address for the paste operation which includes an identifier for a send window context (SWC$_{US}$ ID). The processing core sends the retrieved CRB and the real address including the SWC$_{US}$ ID (590b) on a bus to be received by the accelerator switchboard (510). In one embodiment, the send operation between the processing core (504) and the accelerator switchboard includes the CRB and the real address including the $SWC_{US}$ ID in the same paste operation. However, the elements of the CRB and the real address are separate. The accelerator switchboard (510) accepts the CRB and augments the received CRB with the $SWC_{US}$ ID from the real address. The accelerator switchboard (510) sends the CRB augmented with the $SWC_{US}$ ID (590c) to the work buffer (526). The hardware accelerator (512) pulls the CRB augmented with the $SWC_{US}$ ID (590c) from the work buffer (526). Accordingly, the hardware accelerator is provided with the CRB and the $SWC_{US}$ ID and the hardware accelerator is prepared to attempt execution of the CRB.

During execution of the CRB, the hardware accelerator (512) determines the CRB augmented with the $SWC_{US}$ ID (590c) has an address translation fault. Responsive to the address translation fault, the hardware accelerator (512) flushes the CRB augmented with the $SWC_{US}$ ID from the hardware accelerator (512) and further augments the CRB with fault information. In one embodiment, the further augmentation with fault information is an overwrite and/or removal of the $SWC_{US}$ ID from the CRB. The hardware accelerator (512) sends the CRB augmented with fault information and an identifier of the send window context associated with the hardware accelerator ($SWC_F$ ID) (590d) to be received by the accelerator switchboard (510). The accelerator switchboard (510) accepts the CRB augmented with the fault information and sends the CRB augmented with fault information (590e) to the fault buffer (530). Responsive to instruction from the accelerator switchboard (510), the CRB augmented with the fault information (590e) is retrieved by the operating system (OS) (518) and repaired. After repair of the address translation fault, OS (518) sends the effective address of the repaired CRB (590f) to a processing core (504) and issues a paste operation including the effective address of a destination. In one embodiment, OS (518) sends the repaired CRB and/or effective address of the repaired CRB (590f) to user session (520). Accordingly, a CRB experiences an address translation fault and is repaired by the operating system before being re-executed by the hardware accelerator.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium includes a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Flushing an operation with an address translation fault from the hardware accelerator during repairing of the address translation fault minimizes latency in the computer system It will be appreciated that, although specific embodiments have been described herein for purposes of illustration, various modifications may be made without departing from the spirit and scope of the embodiments. In particular, the type and quantity of operations stored should not be considered limiting. Additionally, the quantity of processing cores utilizing a single hardware accelerator or the quantity of hardware accelerators utilized by a single processing core should not be considered limiting. Accordingly, the scope of protection of these embodiments is limited only by the following claims and their equivalents.

What is claimed is:

1. A system comprising:
   a processing core in communication with memory;
   a hardware accelerator in communication with the processing core;
   the hardware accelerator to determine at least one memory address translation related to an operation having a fault;
   the hardware accelerator to flush the operation and a fault memory address translation from the hardware accelerator, including augment the operation with an entity identifier;
   a switchboard to forward the operation with the fault memory address translation, including the entity identifier, from the hardware accelerator to a second buffer;
   an operating system to repair the fault memory address translation, including an interruption of execution of the operating system;
   the operating system to send the operation with a repaired memory address translation to the processing core utilizing an effective address for an entity based on a first table and an entity identifier within the fault memory address translation;
   the switchboard, supported by the processing core, to forward the operation with the repaired memory address translation from the second buffer to a first buffer; and
   the hardware accelerator to execute the operation with the repaired memory address translation.

2. The system of claim 1, further comprising a second table having the entity identifier associated with a first window context identifier, the second table operatively coupled to a hypervisor, wherein the switchboard utilizes the second table to forward the operation from the processing core.

3. The system of claim 2, wherein the first window context has at least one of: a memory address associated with the first buffer, the entity identifier, a send window credit value, and an identifier for a fault buffer.

4. The system of claim 3, further comprising:
   the processing core to retrieve the first window context identifier utilizing the effective address for the entity; and
   the processing core to provide the first window context identifier to the switchboard.

5. The system of claim 3,
wherein the fault memory address translation repair further comprises the operating system to use a hypervisor call to instruct the hypervisor to adjust the send window credit value associated with the entity identifier, the send window credit value to limit a first quantity of one or more first tasks that the entity identifier can send to the first buffer; and
further comprising the hypervisor to adjust the send window credit value within the first window context based on the second table.

6. The system of claim 1, further comprising movement of the operating system from a first hardware system to a second hardware system wherein a third table on a second hardware system is changed to include the entity identifier associated with a second window context.

7. The system of claim 1, wherein the operation and the fault memory address translation flush enables the hardware accelerator to execute a second operation during the repair of the fault memory address translation.

8. A computer program product for memory translation fault resolution between a processing core and a hardware accelerator, the computer program product comprising a computer readable storage medium having program code embodied therewith, the program code executable by a processor to:
determine at least one memory address translation related to an operation having a fault;
flush the operation and a fault memory address translation from the hardware accelerator, including augment the operation with an entity identifier;
forward the operation with the fault memory address translation, including the entity identifier, from the hardware accelerator to a second buffer;
repair the fault memory address translation, including an interruption of execution of an operating system;
send the operation with a repaired memory address translation to the processing core utilizing an effective address for an entity based on a first table and an entity identifier within the fault memory address translation;
forward the operation with the repaired memory address translation from the second buffer to a first buffer supported by the processing core; and
execute the operation with the repaired memory address translation.

9. The computer program product of claim 8, further comprising program code to configure a second table having the entity identifier associated with a first window context identifier, the second table operatively coupled to a hypervisor, wherein program code utilizes the second table to forward the operation from the processing core.

10. The computer program product of claim 9, wherein the first window context has at least one of: a memory address associated with the first buffer, the entity identifier, a send window credit value, and an identifier for a fault buffer.

11. The computer program product of claim 10, further comprising program code to:
retrieve the first window context identifier utilizing the effective address for the entity identifier; and
provide the first window context identifier to a switchboard.

12. The computer program product of claim 10, further comprising movement of the operating system from a first hardware system to a second hardware system including program code to change a third table on a second hardware system to include the entity identifier associated with a second window context.

13. The computer program product of claim 8, wherein the operation and the fault memory address translation flush enables the hardware accelerator to execute a second operation during the repair of the fault memory address translation.

14. A method for memory translation fault resolution between a processing core and a hardware accelerator, the method comprising:
determining at least one memory address translation related to an operation having a fault;
flushing the operation and a fault memory address translation from the hardware accelerator, including augmenting the operation with an entity identifier;
forwarding the operation with the fault memory address translation, including the entity identifier, from the hardware accelerator to a second buffer;
repairing the fault memory address translation, including an interruption of execution of an operating system;
sending the operation with a repaired memory address translation to the processing core utilizing an effective address for an entity based on a first table and an entity identifier within the fault memory address translation;
forwarding the operation with the repaired memory address translation from the second buffer to a first buffer supported by the processing core; and
executing the operation with the repaired memory address translation.

15. The method of claim 14, further comprising configuring a second table having the entity identifier associated with a first window context identifier, the second table operatively coupled to a hypervisor, wherein forwarding the operation from the processing core utilizes the second table.

16. The method of claim 15, wherein the first window context has at least one of: a memory address associated with the first buffer, the entity identifier, a send window credit value, and an identifier for a fault buffer.

17. The method of claim 16, further comprising:
retrieving the first window context identifier utilizing an effective address for the entity identifier; and
providing the first window context identifier to a switchboard.

18. The method of claim 16,
wherein the fault memory address translation repair further comprises instructing, utilizing a hypervisor call to adjust the send window credit value associated with the entity identifier, the send window credit value to limit a first quantity of one or more first tasks that the entity identifier can send to the first buffer; and
further comprising adjusting the send window credit value within the first window context based on the second table.

19. The method of claim 16, further comprising movement of the operating system from a first hardware system to a second hardware system and further comprising changing a third table on the second hardware system to include the entity identifier associated with a second window context.

20. The method of claim 14, wherein the operation and the fault memory address translation flushing enables the hardware accelerator to execute a second operation during the repairing of the fault memory address translation.

* * * * *